US012713498B2

(12) United States Patent
Leng et al.

(10) Patent No.: US 12,713,498 B2
(45) Date of Patent: Aug. 18, 2026

(54) METHOD FOR WIRELESS COMMUNICATION AND TERMINAL DEVICE

(71) Applicant: GUANGDONG OPPO MOBILE TELECOMMUNICATIONS CORP., LTD., Dongguan (CN)

(72) Inventors: Bingxue Leng, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 312 days.

(21) Appl. No.: 18/496,159

(22) Filed: Oct. 27, 2023

(65) Prior Publication Data

US 2024/0057215 A1 Feb. 15, 2024

Related U.S. Application Data

(63) Continuation of application No. PCT/CN2021/101062, filed on Jun. 18, 2021.

(51) Int. Cl.
*H04W 76/28* (2018.01)
*H04W 76/30* (2018.01)

(52) U.S. Cl.
CPC .......... *H04W 76/28* (2018.02); *H04W 76/30* (2018.02)

(58) Field of Classification Search
None
See application file for complete search history.

(56) References Cited

U.S. PATENT DOCUMENTS 12,342,218 B2* 6/2025 Yoshioka .............. H04W 28/04
2015/0055532 A1* 2/2015 Lu .......................... H04W 76/28 370/311
2019/0306916 A1* 10/2019 Zhou ...................... H04W 48/08
2019/0363843 A1* 11/2019 Gordaychik .......... H04W 28/16
2020/0288432 A1* 9/2020 Min ......................... H04W 4/40
2020/0413480 A1* 12/2020 Lu .......................... H04W 28/06
2021/0051587 A1* 2/2021 Wu ......................... H04W 68/02
2021/0051588 A1* 2/2021 Wu ...................... H04W 56/001
2021/0058941 A1* 2/2021 Cheng ........................ H04L 5/18
2021/0059004 A1* 2/2021 Wu ...................... H04W 72/569
2021/0059005 A1 2/2021 Hosseini et al.
2021/0176720 A1* 6/2021 Chae ...................... H04W 92/18

(Continued)

FOREIGN PATENT DOCUMENTS

CN 111800764 10/2020
EP 3829198 6/2021
WO 2021087849 5/2021

OTHER PUBLICATIONS

OPPO, "Discussion on DRX configuration," 3GPP TSG-RAN WG2 #113bis-e, R2-2102886, Apr. 2021.

(Continued)

*Primary Examiner* — Otis L Thompson, Jr.
(74) *Attorney, Agent, or Firm* — Hodgson Russ LLP

(57) ABSTRACT

A method for wireless communication and a terminal device are provided. The method for wireless communication includes the following. A first terminal obtains first configuration information. The first terminal transmits a service to a second terminal according to the first configuration information. The first configuration information indicates a transmission format of the service.

15 Claims, 7 Drawing Sheets

400

RECEIVE, BY THE FIRST TERMINAL, SECOND TERMINAL INFORMATION TRANSMITTED BY THE SECOND TERMINAL, WHERE THE SECOND TERMINAL INFORMATION INDICATES A TRANSMISSION FORMAT SUPPORTED BY THE SECOND TERMINAL — S410

↓

DETERMINE, BY THE FIRST TERMINAL, THE FIRST CONFIGURATION INFORMATION ACCORDING TO THE SECOND TERMINAL INFORMATION — S420

(56) References Cited

U.S. PATENT DOCUMENTS

| | | | | |
|---|---|---|---|---|
| 2021/0185761 | A1* | 6/2021 | Narula | H04L 41/0803 |
| 2021/0211850 | A1* | 7/2021 | Yang | H04W 4/40 |
| 2021/0227620 | A1* | 7/2021 | Pan | H04W 4/40 |
| 2021/0227622 | A1* | 7/2021 | Kung | H04W 76/28 |
| 2021/0410162 | A1* | 12/2021 | Kang | H04W 72/1263 |
| 2022/0015186 | A1* | 1/2022 | Jeong | H04L 1/1896 |
| 2022/0174780 | A1* | 6/2022 | Bao | H04W 76/28 |
| 2022/0304103 | A1* | 9/2022 | Cheng | H04W 76/14 |
| 2023/0007727 | A1* | 1/2023 | Fan | H04L 1/1896 |
| 2023/0014303 | A1* | 1/2023 | Di Girolamo | H04W 72/20 |
| 2023/0156858 | A1* | 5/2023 | Freda | H04W 52/0219 370/329 |
| 2023/0164873 | A1* | 5/2023 | Hahn | H04W 52/0229 370/328 |
| 2023/0199908 | A1* | 6/2023 | Luo | H04W 76/28 370/328 |
| 2024/0260126 | A1* | 8/2024 | Park | H04W 76/28 |

OTHER PUBLICATIONS

EPO, Extended European Search Report for EP Application No. 21945558.1, Apr. 29, 2024.

"3rd Generation Partnership Project; Technical Specification Group Radio Access Network; NR; Medium Access Control (MAC) protocol specification (Release 16)," 3GPP TS 38.321, Mar. 2021, v16.4.0.

OPPO, "Discussion on DRX configuration and DRX timers," 3GPP TSG-RAN WG2 #114-e, R2-2104835, May 2021.

ZTE Corporation et al., "Discussion on SL DRX configuration," 3GPP TSG-RAN WG2 Meeting #114 electronic, R2-2105077, May 2021.

Apple et al., "Discussion on RX-centric and Tx-centric in SL unicast DRX," 3GPP TSG-RAN WG2 Meeting #114-e, R2-2105131, May 2021.

WIPO, International Search Report and Written Opinion for International Application No. PCT/CN2021/101062, Feb. 24, 2022.

EPO, Communication for EP Application No. 21945558.1, Feb. 21, 2025.

EPO, Communication for EP Application No. 21945558.1, Sep. 3, 2025.

* cited by examiner

METHOD FOR WIRELESS COMMUNICATION AND TERMINAL DEVICE

CROSS REFERENCE TO RELATED APPLICATION(S)

This application is a continuation of International Application No. PCT/CN2021/101062, filed Jun. 18, 2021, the entire disclosure of which is incorporated herein by reference.

TECHNICAL FIELD

Embodiments of the disclosure relate to the field of communication, and more particularly, to a method for wireless communication and a terminal device.

BACKGROUND

In order to realize direct communication between terminals in a vehicle to everything (V2X) system, a sidelink (SL) transmission mode is introduced.

In new radio (NR) SL communication, new power saving mechanisms for SL are introduced. Terminal devices with different power saving mechanisms may be unable to communicate with each other due to incompatibility between transmission formats. Therefore, how to configure a transmission format of a corresponding receiving terminal/transmitting terminal when multiple terminal devices communicate with each other is a problem to be solved.

SUMMARY

In a first aspect, a method for wireless communication is provided. The method includes the following. A first terminal obtains first configuration information. The first terminal transmits a service to a second terminal according to the first configuration information. The first configuration information indicates a transmission format of the service.

In a second aspect, a method for wireless communication is provided. The method includes the following. A second terminal obtains first configuration information. The second terminal receives a service transmitted by a first terminal according to the first configuration information. The first configuration information indicates a transmission format of the service.

In a third aspect, a terminal device is provided. The terminal device includes a transceiver, a memory configured to store computer programs, and a processor configured to execute the computer programs stored in the memory to: obtain first configuration information, and cause the transceiver to transmit a service to a second terminal according to the first configuration information. The first configuration information indicates a transmission format of the service.

In a fourth aspect, a terminal device is provided. The terminal device includes a transceiver, a memory configured to store computer programs, and a processor configured to execute the computer programs stored in the memory to: obtain first configuration information, and cause the transceiver to receive a service transmitted by a first terminal according to the first configuration information. The first configuration information indicates a transmission format of the service.

Other features and aspects of the disclosed features will become apparent from the following detailed description, taken in conjunction with the accompanying drawings, which illustrate, by way of example, the features in accordance with embodiments of the disclosure.

The summary is not intended to limit the scope of any embodiments described herein.

DETAILED DESCRIPTION

Figure 1:
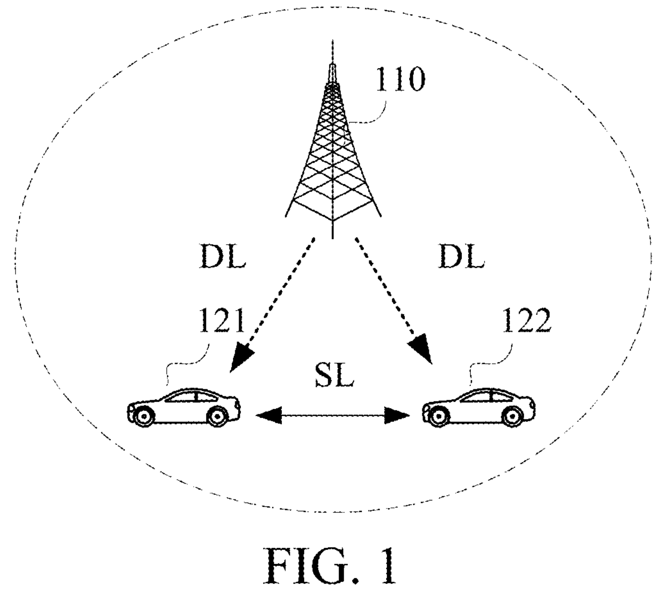
FIG. 1 is a schematic diagram of an architecture of a communication system provided in embodiments of the disclosure.

The following will describe technical solutions of embodiments of the disclosure with reference to the accompanying drawings in embodiments of the disclosure. Apparently, embodiments described herein are merely some embodiments, rather than all embodiments, of the disclosure. For embodiments described herein, all other embodiments obtained by those of ordinary skill in the art without creative effort shall fall within the protection scope of the disclosure.

The technical solutions of embodiments of the disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area networks (WLAN), a wireless fidelity (WiFi), a 5th-generation (5G) system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication, or vehicle to everything (V2X) communication. Embodiments of the disclosure can also be applied to these communication systems.

Optionally, a communication system of embodiments of the disclosure may be applied to a carrier aggregation (CA) scenario, a dual connectivity (DC) scenario, or a standalone (SA) network deployment scenario.

Optionally, the communication system of embodiments of the disclosure may be applied to an unlicensed spectrum or a licensed spectrum, where the unlicensed spectrum may also be referred to as a shared spectrum, and the licensed spectrum may also be referred to as a non-shared spectrum.

Embodiments of the disclosure have been described in connection with the network device and the terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device.

The terminal device may be a station (ST) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, and a next-generation communication system, for example, a terminal device in an NR network, a terminal device in a future evolved public land mobile network (PLMN), etc.

In embodiments of the disclosure, the terminal device may be deployed on land, for example, deployed indoors or outdoors, and may be handheld, wearable, or vehicle-mounted. The terminal device may also be deployed on water, for example, on a ship, etc. The terminal device may also be deployed in the air, for example, on an airplane, an air balloon, a satellite, etc.

In embodiments of the disclosure, the terminal device may be a mobile phone, a pad, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

By way of explanation rather than limitation, according to embodiments of the disclosure, the terminal device may also be a wearable device. The wearable device may also be called a wearable smart device, which is a generic term of wearable devices obtained through intelligentization designing and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In embodiments of the disclosure, the network device may be a device configured to communicate with a mobile device, and the network device may be an access point (AP) in the WLAN, a base transceiver station (BTS) in the GSM or CDMA, may also be a Node B (NB) in WCDMA, and may further be an evolutional Node B (eNB or eNodeB) in LTE, or a relay station or AP, or an in-vehicle device, a wearable device, a network device (gNB) in the NR network, a network device in the future evolved PLMN, a network device in a NTN, etc.

By way of example rather than limitation, in embodiments of the disclosure, the network device may be of mobility. For example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station located on land, water, etc.

In embodiments of the disclosure, the network device can provide services for a cell, and the terminal device communicates with the network device through a transmission resource (for example, a frequency-domain resource or a spectrum resource) for the cell. The cell may be a cell corresponding to the network device (for example, a base station). The cell may correspond to a macro base station, and may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

The terms used in implementation part of the disclosure are only used to illustrate specific embodiments of the disclosure, but not intended to limit the disclosure. The terms "first", "second", "third", "fourth", and the like in the specification, claims, and drawings of the disclosure are used to distinguish different objects, but not to describe a specific order. In addition, the terms "including", "comprising", "having", and any variations thereof are intended to cover non-exclusive inclusions.

It should be understood that, the terms "system" and "network" herein are usually interchangeable. The term "and/or" herein describes only an association relationship for describing associated objects and represents that three relationships may exist. For example, A and/or B may represent the following three cases: only A exists, both A and B exist, and only B exists. In addition, the character "/" herein generally indicates an "or" relationship between the associated objects.

It should be understood that, the "indication" mentioned in embodiments of the disclosure may be a direct indication or an indirect indication, or indicate an association. For example, if A indicates B, it can mean that A directly indicates B, for example, B can be obtained through A, or mean that A indicates B indirectly, for example, A indicates C, and B can be obtained through C, or it can also mean that there is an association between A and B.

In the description of embodiments of the disclosure, the term "corresponding" can mean that there is a direct or indirect correspondence between two elements, or that there is an association between two elements, or that there is a relationship of "indicating" and "being indicated", "configuring" and "being configured", and the like.

In embodiments of the disclosure, the "predefined" can be implemented by pre-saving a corresponding code or table in a device (for example, including the terminal device and the network device) or in other manners that can be used for indicating related information, and the disclosure is not limited in this regard. For example, the "predefined" may mean defined in a protocol.

In embodiments of the disclosure, the "protocol" may refer to a communication standard protocol, which may include, for example, an LTE protocol, an NR protocol, and a protocol applied to a future communication system, and the disclosure is not limited in this regard.

To facilitate understanding of the technical solutions of embodiments of the disclosure, relevant content of sidelink (SL) transmission of the disclosure is briefly described.

1. LTE D2D Communication and LTE V2X Communication

D2D communication is a SL transmission technology based on D2D. Different from a traditional cellular system in which communication data is received or transmitted via the base station, in a V2X system, D2D direct communication is adopted, which therefore has higher spectral efficiency and lower transmission delay.

FIG. 1 is a schematic diagram of a communication system applicable to embodiments of the disclosure. Transmission resources of an in-vehicle terminal (in-vehicle terminals 121 and 122) are allocated by a base station 110. The in-vehicle terminal performs data transmission on an SL on the resource allocated by the base station 110. Specifically, the base station 110 may allocate to the terminal a resource for single transmission, or may allocate to the terminal a resource for semi-persistent transmission.

Figure 2:
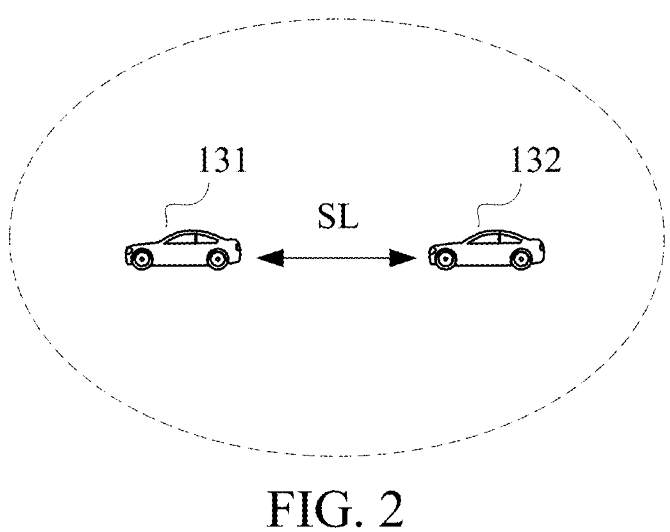
FIG. 2 is a schematic diagram of another architecture of a communication system provided in embodiments of the disclosure.

FIG. 2 is a schematic diagram of another communication system applicable to embodiments of the disclosure. An in-vehicle terminal (in-vehicle terminals 131 and 132) autonomously selects a transmission resource from resources on the SL for data transmission. Optionally, the in-vehicle terminal can select a transmission resource randomly or by listening.

To facilitate understanding of embodiments of the disclosure, terms related to the disclosure will be described.

Proximity-based service (ProSe): D2D communication in release 12 (Rel-12) or release 13 (Rel-13) is studied on ProSe scenarios, which is mainly for public security service.

In ProSe, positions of a resource pool in time domain are configured, for example, the resource pool is discontinuous in time domain, so that a UE can perform discontinuous data transmission/reception on an SL, thereby realizing power saving.

V2X: In release 14 (Rel-14) or release 15 (Rel-15), a V2X system is studied on vehicle-to-vehicle communication scenarios, which is mainly for V2V communication services and vehicle-to-pedestrian (V2P) communication services with relatively high-speed movement. In V2X, since an in-vehicle system has continuous power supply, power efficiency is not a major issue. However, delay of data transmission is a major issue, and therefore, when designing a system, a terminal device is required to support continuous transmission and reception.

Further-enhanced D2D (FeD2D): In Rel-14, this scenario is studied on access by a wearable device to a network via a mobile phone, which is mainly for low-speed movement scenarios and low-power access scenarios. In FeD2D, in a pre-research stage, it is concluded by 3GPP that a base station may configure a DRX parameter for a remote terminal via a relay terminal.

2. NR V2X Communication

Figure 3:
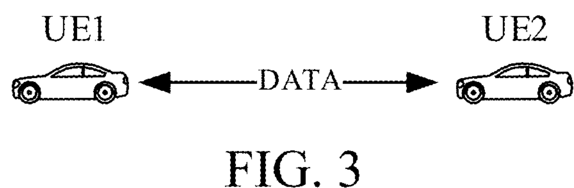
FIG. 3 is a schematic diagram of a unicast sidelink (SL) communication provided in the disclosure.
Figure 4:
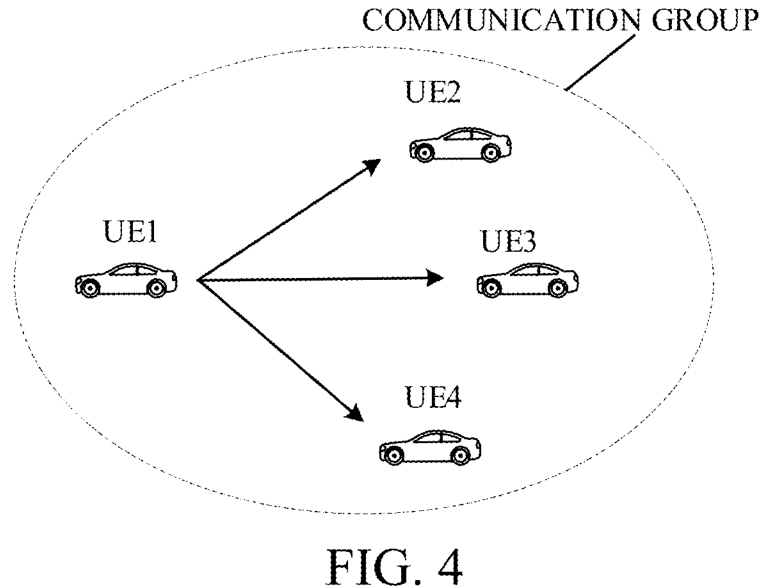
FIG. 4 is a schematic diagram of a groupcast SL communication provided in the disclosure.
Figure 5:
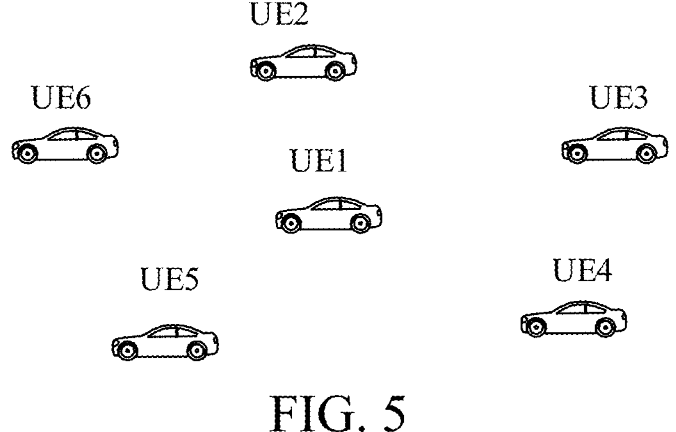
FIG. 5 is a schematic diagram of a broadcast SL communication provided in the disclosure.

On the basis of LTE V2X, NR V2X is not limited to broadcast scenarios, but has been expanded to unicast and groupcast scenarios, and the application of V2X is studied on these scenarios. For the unicast transmission mode, there is only one receiving terminal. As illustrated in FIG. 3, UE 1 and UE 2 perform unicast transmission. For the groupcast transmission mode, all terminals in a communication group or all terminals within a certain transmission distance are receiving terminals. As illustrated in FIG. 4, UE 1, UE 2, UE 3, and UE 4 form a communication group, where UE 1 transmits data, and other terminal devices in the group are all receiving devices. For the broadcast transmission mode, any terminal around the transmitting terminal is a receiving terminal. As illustrated in FIG. 5, UE 1 is a transmitting terminal, and other terminals around UE 1, namely UE 2 to UE 6 are all receiving terminals.

Similar to LTE V2X, NR V2X may also define two resource authorization modes, namely mode 1 (corresponding to the communication system illustrated in FIG. 1) and mode 2 (corresponding to the communication system illustrated in FIG. 2). Further, the user may be in a mixed mode, that is, the user can obtain a resource in both mode 1 and mode 2. The resource obtainment is indicated by an SL grant. That is, the SL grant indicates time-frequency locations of a corresponding physical sidelink control channel (PSCCH) and a corresponding physical sidelink shared channel (PSSCH) resource.

Different from LTE V2X, in addition to no-feedback hybrid automatic repeat request (HARQ) retransmission initiated by the UE autonomously, NR V2X introduces feedback-based HARQ retransmission, which is not limited to unicast communication, but also includes groupcast communication.

Like LTE V2X, in NR V2X, since an in-vehicle system has continuous power supply, power efficiency is not a major issue. However, delay of data transmission is a major issue, and therefore, when designing a system, a terminal device is required to support continuous transmission and reception.

3. Discontinuous Reception (DRX)

The UE may discontinuously monitor a physical downlink control channel (PDCCH) according to a DRX configuration to realize power saving. The UE may perform a corresponding DRX operation according to control information when the PDCCH carries a cell radio network temporary identity (C-RNTI), a cancellation indication RNTI (CI-RNTI), a configured scheduling RNTI (CS-RNTI), an interrupted transmission indication RNTI (INT-RNTI), a slot format indication RNTI (SFI-RNTI), a semi-persistent channel state information RNTI (SP-CSI-RNTI), a transmit power control physical uplink control channel RNTI (TPC-PUCCH-RNTI), a transmit power control physical uplink shared channel RNTI (TPC-PUSCH-RNTI), a transmit power control sounding reference signal RNTI (TPC-SRS-RNTI), or an artificial intelligence RNTI (AI-RNTI) corresponding to the UE. The network controls a DRX behavior of the UE by configuring a series of parameters. These parameters include: drx-onDurationTimer, drx-SlotOffset, drx-InactivityTimer, drx-RetransmissionTimerDL, drx-RetransmissionTimerUL, drx-LongCycleStartOffset, drx-ShortCycle (optional): the short DRX cycle, drx-ShortCycleTimer (optional), downlink HARQ round trip time timer (HARQ-RTT-TimerDL), uplink DRX HARQ RTT (drx-HARQ-RTT-TimerUL), power saving wakeup (ps-Wakeup) (optional), power saving transmit other periodic channel state information (ps-TransmitOtherPeriodicCSI) (optional), and power saving transmit periodic L1 reference signal received power (ps-TransmitPeriodicL1-RSRP).

After a new power saving mechanism, such as DRX, is introduced in REL-17, there may be both an R17 UE supporting the new power saving mechanism and an R16 UE not supporting this mechanism or a UE of a lower release in a link of an SL network. This may result in communication failure between UEs due to incompatibility between releases of the UEs. Therefore, how to configure a transmission format of a receiving terminal/transmitting terminal when multiple terminal devices communicate with each other is a problem to be solved. To facilitate understanding of the technical solutions of embodiments of the disclosure, the technical solutions of the disclosure are described in detail below with specific embodiments. The related art above can be arbitrarily combined with the technical solutions of embodiments of the disclosure as optional solutions, which all fall within the scope of embodiments of the disclosure. Embodiments of the disclosure include at least part of the following.

Figure 6:
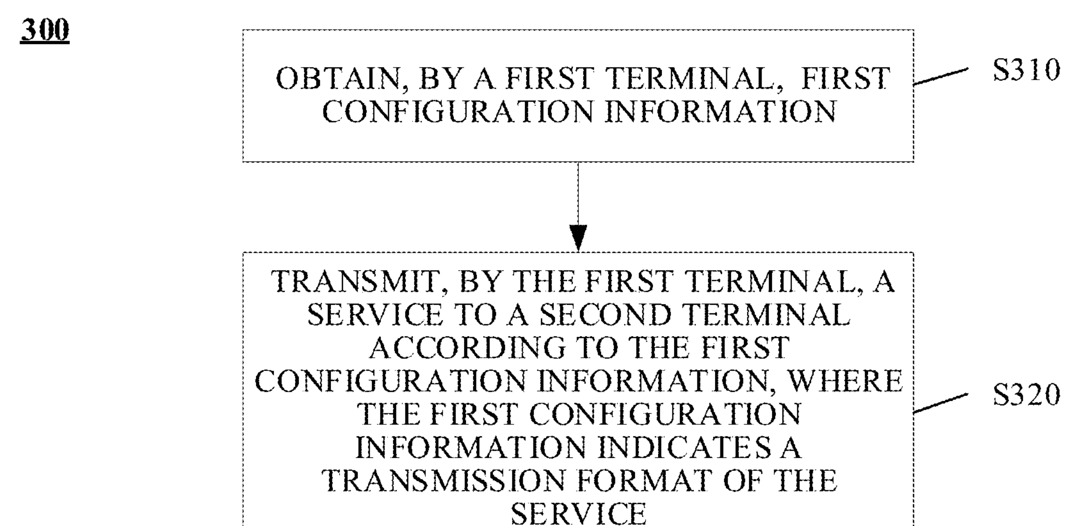
FIG. 6 is a schematic diagram of a method for wireless communication according to embodiments of the disclosure.

FIG. 6 is a schematic flowchart of a method for wireless communication 300 according to embodiments of the disclosure, which is applicable to SL transmission between a first terminal and a second terminal. As illustrated in FIG. 6, the method for wireless communication can be performed by the first terminal.

S310. A first terminal obtains first configuration information.

S320. The first terminal transmits a service to a second terminal according to the first configuration information, where the first configuration information indicates a transmission format of the service.

In some embodiments of the disclosure, when the first terminal transmits the service to the second terminal, the first terminal may obtain the first configuration information and transmit the service to the second terminal according to the transmission format of the service indicated by the first configuration information. The transmission format of the service is indicated, which avoids inconsistency in the transmission format between the transmitting terminal and the receiving terminal, thereby solving the problem of communication failure due to incompatibility between releases of the UEs in the related art.

Optionally, the first configuration information may be configured by a network device or specified in a preconfigured protocol, or the first configuration information is determined based on the implementation of the first terminal, or the first configuration information is received from another terminal device or negotiated with another terminal device.

Optionally, the transmitted service may also be a data packet or data transmitted through the service, which is not limited herein.

In some embodiments, the first configuration information includes release information, where the release information indicates a protocol release compatible with the service or a protocol release corresponding to the service, such as, release 14, release 15, release 16, release 17, or the like.

In some embodiments, a value of the release information indicates a target release corresponding to the service among at least two releases. For example, the release information includes at least one bit, where the release information indicates that the target release is a first release when the value of the bit is 0, and indicates that the target release is a second release when the value of the bit is 1.

In some embodiments, the first release does not support DRX and the second release supports DRX.

In some embodiments, the first release is release 16 and the second release is release 17.

For example, a value field of the release information is rel16 or rel17. The release information includes one bit. The release information indicates rel16 when the value of the bit is 0, and indicates rel17 when the value of the bit is 1. In this case, there are only two transmission format indications for each service. When the transmission format is indicated as rel16, it indicates that the service needs to be transmitted in a format compatible with release R16. Alternatively, when the transmission format is indicated as rel17, it indicates that the service needs to be transmitted in a format compatible with release R17.

For another example, a value field of the first configuration information is rel16 and/or rel17. The release information includes two bits. The release information indicates rel16 when the value of the two bits is 10, indicates rel17 when the value of the two bits is 01, and indicates rel16 and rel17 when the value of the two bits is 11. That is, there are three format indications for each service. When the transmission format is indicated as rel16, it indicates that the service needs to be transmitted in a format compatible with R16. Alternatively, when the transmission format is indicated as rel17, it indicates that the service needs to be transmitted in a format compatible with R17. Alternatively, when the transmission format is indicated as rel16 and rel17, it indicates that the service can be transmitted in both a format compatible with R16 and a format compatible with R17.

In some embodiments, the first configuration information includes compatibility information, where the compatibility information indicates that the service enables DRX, or the compatibility information indicates that the service does not enable DRX.

For example, a value field of the compatibility information is DRX enable or DRX disable. The compatibility information includes one bit. The compatibility information indicates DRX enable when the value of the bit is 0, and indicates DRX disable when the value of the bit is 1. In this case, there are only two transmission format indications for each service. When the transmission format is indicated as DRX enable, it indicates that the service enables DRX. Alternatively, when the transmission format is indicated as DRX disable, it indicates that the service does not enable DRX.

For another example, a value field of the compatibility information is DRX enable and/or DRX disable. The compatibility information includes two bits. The compatibility information indicates DRX enable when the value of the two bits is 10, indicates DRX disable when the value of the two bits is 01, and indicates {DRX enable, DRX disable} when the value of the two bits 11. That is, there are three format indications for each service. When the transmission format is indicated as DRX enable, it indicates that the service enables DRX. Alternatively, when the transmission format is DRX disable, it indicates that the service does not enable DRX. Alternatively, when the transmission format is indicated as {DRX enable, DRX disable}, it indicates that the service can be transmitted in both a DRX mode and a continuous transmission mode.

In some embodiments of the disclosure, the first configuration information may be a transmission (Tx) profile or carried in the Tx profile. In this case, the Tx profile can indicate information of different releases or compatibilities that the service can support. A higher layer configures a mapping between the Tx profile and the SL transmission service to an access stratum (AS), and the AS determines the transmission format or transmission mode of the transmission service according to the indication of the Tx profile. For example, a parameter SL-V2X-TxProfile-r17 is defined. A value field of this parameter is {rel16, rel17}. It can be understood that, release rel17 indicates that corresponding data needs to be transmitted in a transmission format compatible with release 17. Alternatively, a parameter SL-V2X-TxProfile-r15 defined in LTE can also be reused. A value field of this parameter is {rel14, rel15}, where rel14 indicates that corresponding data needs to be transmitted in a format compatible with a protocol of release 14, and rel15 indicates that corresponding data needs to be transmitted in a format compatible with a protocol of release 15. It can be understood that, when the parameter SL-V2X-TxProfile-r15 is reused, the first configuration information can be carried in an existing bit of this parameter or in an expanded new bit, which is not limited herein.

Optionally, the first configuration information is carried in a reserved field or a reserved bit of the Tx profile, or an invalid bit of an existing field of the Tx profile may be used to indicate the release information or the compatibility information of the transmission service, which is not limited herein.

In some embodiments, the first configuration information is determined according to a service type of the service.

Optionally, the service type includes at least one of: platooning between UEs, sensor sharing, information sharing for automated driving, cooperative lane change, platooning informative exchange, information sharing with road side unit (RSU), cooperative collision avoidance, or emergency trajectory alignment, etc.

In some embodiments, the first configuration information is determined according to a groupcast identity (group ID) of the service. For example, the first configuration information is determined according to a media access control (MAC) address of the first terminal, i.e., a layer-2 address of the transmitting terminal, a MAC address of the second terminal, i.e., a layer-2 address of the receiving terminal, or a MAC address of another terminal participating in the transmission of the service, which is not limited herein.

In some embodiments of the disclosure, the method 300 further includes the following.

The first terminal obtains second configuration information, where the second configuration information indicates a mapping between the first configuration information and the service type and/or a mapping between the first configuration and the groupcast identity.

For example, when the first configuration information is a Tx profile, the Tx Profile can be configured according to the service type. That is, each service type is configured with a corresponding Tx profile, or multiple service types are jointly configured with a corresponding Tx profile. Alternatively, the Tx Profile can be configured according to the groupcast identity. That is, each groupcast identity is configured with a corresponding Tx profile, or multiple groupcast identities are configured with a corresponding Tx profile. The first terminal can determine the Tx profile corresponding to the service type or the groupcast identity of the transmission service according to the second configuration information, and transmit the service according to the transmission format indicated by the Tx profile.

Optionally, the mapping may be in a form of a sequence or a table, which is not limited herein.

Optionally, the second configuration information is configured by a network device, predefined, specified in a protocol, or transmitted by the second terminal, which is not limited herein.

In some embodiments, the first terminal transmits the service to the second terminal according to a predefined transmission format if the first terminal fails to obtain the first configuration information. For example, the predefined transmission format includes a transmission format corresponding to the first release or does not support DRX. That is, when the first terminal is not configured with the first configuration information, the first terminal transmits the service in a transmission format compatible with a lower release or a continuous reception mode by default, or the first terminal may transmit the service in a transmission format compatible with a higher release or a DRX mode by default.

Optionally, continuous reception may also be referred to as non-DRX.

In some embodiments of the disclosure, the first terminal transmits the service to the second terminal according to first terminal information and the first configuration information, where the first terminal information indicates a transmission format supported by the first terminal. For broadcast, groupcast, or unicast, the first terminal may determine the transmission format for transmitting the service according to its own compatibility and the indication of the first configuration information corresponding to the service type.

Optionally, in the broadcast transmission mode, a direct communication request (DCR), a discovery message, or other messages transmitted in a broadcast manner is transmitted.

Optionally, the first terminal information may indicate a release compatible with the first terminal or directly indicate whether the first terminal supports DRX.

In some embodiments, the service is transmitted to the second terminal in a transmission format or corresponding to the first release or a continuous transmission mode if the first terminal information indicates that the first terminal is a terminal of the first release or does not support DRX, For example, if the first terminal is a terminal of release 16, the first terminal may transmit a service of rel16, a DRX disable service, a service of {rel16, rel17}, or a service of {DRX enable, DRX disable} indicated by the first configuration information, and transmit the service in a transmission format compatible with release 16 or a continuous transmission mode.

In some embodiments of the disclosure, the first terminal transmits the service to the second terminal according to the first configuration information if the first terminal information indicates that the first terminal is a terminal of the second release or supports DRX.

For example, if the first terminal is a terminal of release 17, the first terminal may transmit a service of rel16, a service of rel17, a DRX enable service, a DRX disable service, a service of {DRX enable, DRX disabled}, and/or a service of {rel16, rel17} indicated by the first configuration information, and transmit the service in a transmission format indicated by the first configuration information.

For example, if the first configuration information indicates that the service is of rel16 or DRX disabled, the service is transmitted in a transmission format compatible with R16 or a continuous transmission mode.

For example, if the first configuration information indicates that the service is of rel16 or {rel16, rel17} and the transmission mode is groupcast or broadcast, the service is transmitted in a transmission format compatible with R16 or a continuous transmission mode.

For example, if the first configuration information indicates that the service is of rel16 or {rel16, rel17} and the transmission mode is unicast, the first terminal may transmit the service in a transmission format compatible with R16 or a continuous transmission mode after coordinating with the second terminal.

For another example, if the first configuration information indicates that the service is of R17 or DRX enable, the first terminal may transmit the service to the second terminal in at least one of: a DRX mode, a non-DRX continuous transmission mode, a transmission format compatible with R17, or a transmission format compatible with R16.

In conclusion, in the disclosure, the first terminal can determine the transmission format for transmitting a specific service according to the transmission format indicated by the first configuration information and its own compatibility, thereby ensuring normal transmission compatible with different services.

Figure 7:
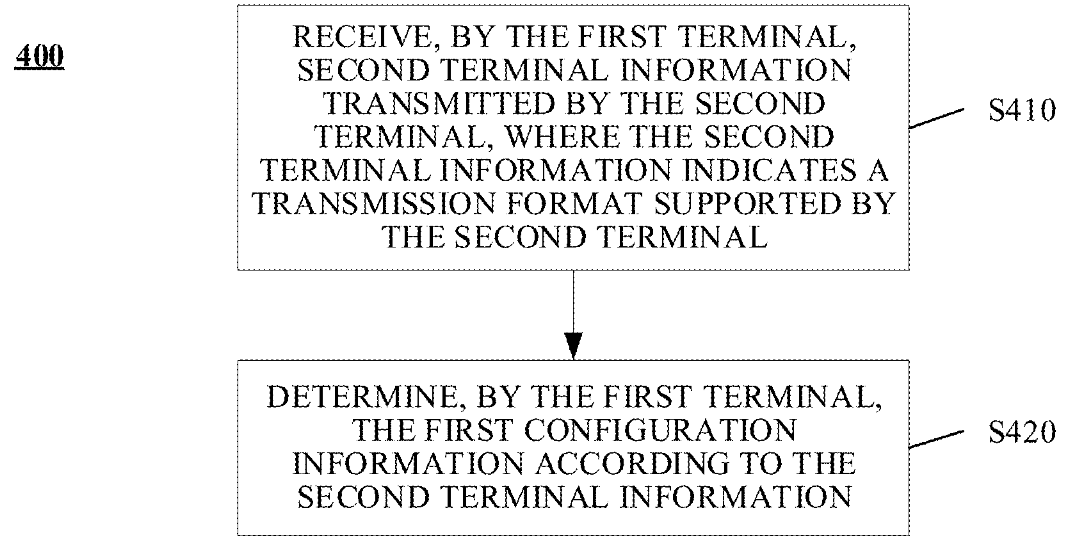
FIG. 7 is a schematic diagram of a method for wireless communication according to other embodiments of the disclosure.

FIG. 7 is a schematic interaction diagram of a method for wireless communication 400 according to embodiments of the disclosure. As illustrated in FIG. 7, the method 400 at least includes the following.

S410: The first terminal receives second terminal information transmitted by the second terminal, where the second terminal information indicates a transmission format supported by the second terminal.

In some embodiments of the disclosure, the method 400 further includes the following.

S420: The first terminal determines the first configuration information according to the second terminal information.

The first terminal determines the transmission format of the service according to the first terminal information and the first configuration information, and transmits the service to the second terminal according to the transmission format of the service. It can be understood that, after a PC-RRC connection is established for the first terminal and the second terminal, the transmitting terminal and the receiving terminal can determine the transmission format through coordination.

Figure 8:
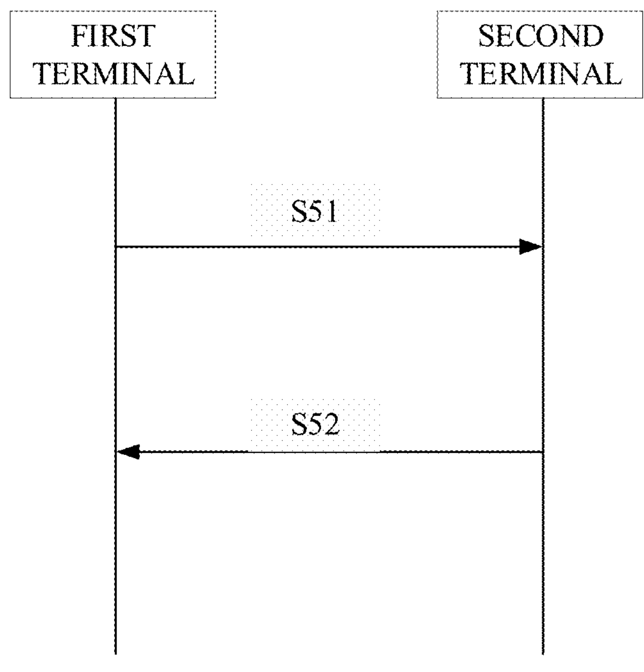
FIG. 8 is a schematic interaction diagram of a method for wireless communication according to embodiments of the disclosure.

In some embodiments of the disclosure, as illustrated in FIG. 8, the first terminal and the second terminal obtain the second terminal information by performing operations described in S51 to S52 below.

S51: The first terminal transmits a configuration signaling to the second terminal, where the configuration signaling includes no configuration related to the second terminal information.

For example, the first terminal transmits the configuration signaling to the second terminal, where the configuration signaling includes no configuration signaling for SL DRX.

Optionally, the configuration signaling may also be a reconfiguration signaling.

S52: The first terminal receives configuration complete information and/or the second terminal information transmitted by the second terminal.

In some embodiments, the second terminal receives the configuration signaling and only replies a configuration complete signaling to the first terminal, then the first terminal and the second terminal transmit the service in a continuous transmission mode.

In other embodiments, the second terminal receives the configuration signaling and replies the configuration complete signaling and the second terminal information to the second terminal. The second terminal information includes a transmission format configuration suggested by the second terminal, and the first terminal supports the transmission format, then the first terminal configures the transmission format for the second terminal according to a DRX configuration suggested by the second terminal, and the first terminal and the second terminal transmit the service according to a coordinated transmission format. If the first terminal does not support the transmission format, the first terminal and the second terminal transmit the service according to a predefined transmission format. For example, the service is transmitted in a continuous transmission mode or in a transmission format corresponding to R16.

Optionally, the second terminal information may also be carried in the configuration complete signaling for transmission.

Figure 9:
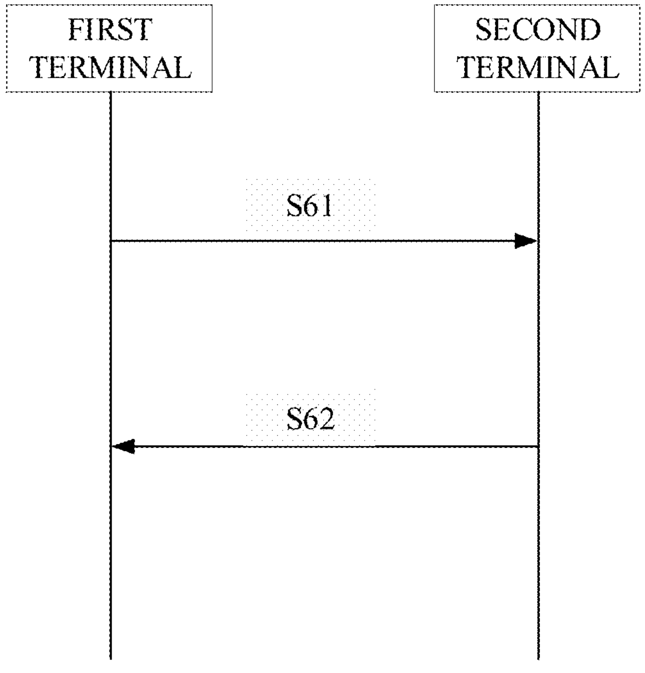
FIG. 9 is a schematic interaction diagram of a method for wireless communication according to other embodiments of the disclosure.

In some embodiments of the disclosure, as illustrated in FIG. 9, the first terminal and the second terminal obtain the second terminal information by performing operations described in S61 to S62 below.

S61: The first terminal transmits a compatibility enquiry signaling to the second terminal, where the compatibility enquiry signaling is used to enquire the second terminal information.

S62: The first terminal receives the second terminal information transmitted by the second terminal. It can be understood that, for communication where a PC5-RRC connection is established, the first terminal and the second terminal may also coordinate the transmission format through a compatibility transfer procedure.

For example, the first terminal transmits the compatibility enquiry signaling to the second terminal, and the second terminal replies with compatibility information of the second terminal. If the second terminal supports DRX, the second terminal replies to the first terminal that the second terminal supports DRX, and if the first terminal also supports DRX and knows from the second terminal information that the second terminal supports DRX, the transmitting terminal and the receiving terminal coordinate a DRX configuration and communicate according to the coordinated DRX configuration. If the first terminal supports DRX and knows from the second terminal information that the second terminal does not support DRX, the transmitting terminal and the receiving terminal communicate in a continuous transmission mode. Alternatively, if the transmitting UE does not support DRX, the transmitting terminal and the receiving terminal communicate in the continuous transmission mode.

Optionally, the second terminal information may indicate a release compatible with the second terminal, directly indicate whether the second terminal supports DRX, or indicate a transmission format suggested by the second terminal, which is not limited herein.

In conclusion, in the disclosure, the first terminal can determine the first configuration information according to the second terminal information, and determine the transmission format for transmitting the service according to its own compatibility and the first configuration information, thereby ensuring normal transmission compatible with different services.

In some embodiments of the disclosure, the first terminal may also determine the transmission format for transmitting the service according to the first terminal information, the second terminal information, and the first configuration information.

For example, the first configuration information is a Tx profile, and the first terminal determines the transmission format for transmitting the service according to its own release information or compatibility information and release information or compatibility information of the second terminal. R16 does not support DRX, and R17 supports DRX. According to compatibilities of the transmitting terminal and the receiving terminal, the transmission mode can be illustrated in Table 1.

TABLE 1

| | the first terminal is of R16 | the second terminal is of R17 |
|---|---|---|
| the second terminal is of R16 | the first terminal transmits the service in a continuous transmission non-DTX mode, and the second terminal receive the service in a continuous reception non-DRX mode | set the Tx profile as R17, the first terminal can transmit the service in a discontinuous transmission mode DTX or non-DTX, and the second terminal can receive the service in a non-DRX mode |
| the second terminal is of R17 | set the Tx profile as R16, the first terminal transmits the service in a non-DTX mode, and the second terminal receive the service in a non-DRX mode | the first terminal can transmit the service in a non-DTX mode or DTX mode, and the second terminal can receive the service in a non-DRX mode or DRX mode |

For example, the first terminal is a terminal of R17, and the first terminal can transmit a transmission service of rel16 (DRX disable) and/or {rel16, rel17} and/or rel17 (DRX enable) indicated by the Tx profile, and transmit the service in a format compatible with R16 or R17 according to the compatibility of the receiving UE. If the Tx profile indicates rel16 or {rel16, rel17}, the transmission mode is unicast, that is, after a PC-RRC connection is established with the second terminal, and the second terminal is of R16, the service may be transmitted in a transmission format compatible with R16 (e.g., not supporting DRX). If the Tx profile indicates rel16 or {rel16, rel17} or no Tx profile is configured, the transmission mode is unicast, that is, after a PC5-RRC connection is established with the other UE, and the second terminal is of R17, the service may be transmitted in a transmission format compatible with R16 (e.g., not supporting DRX) or in a transmission format compatible with R17 (e.g., supporting DRX).

For example, if the second terminal is a terminal of R16, the second terminal can receive a service of rel16 (including rel16 by default when not indicated) and/or {rel16, rel17} and/or rel17 indicated by the Tx profile and transmitted in a transmission format compatible with R16, or a service of {rel16, rel17} and/or rel17 indicated by the Tx profile and transmitted in a transmission format compatible with R17 (e.g., a service supporting DRX). The second terminal is always in a non-DRX mode to receive the service.

For example, if the second terminal is a terminal of R17, the second terminal can receive a transmission service of rel16 (including rel16 by default when not indicated) and/or {rel16, rel17} indicated by the Tx profile and transmitted in a format compatible with R16 (e.g., a service not supporting DRX), in which case the R17 UE is in a continuous reception state, or a transmission service of {rel16, rel17} and/or rel17 indicated by the Tx profile and transmitted in a format compatible with R17 (e.g., a service supporting DRX), in which case the second terminal can be in a DRX mode to receive the service.

In conclusion, in the disclosure, the first terminal determines the transmission format for transmitting the service according to the first terminal information, the second terminal information, and the first configuration information, thereby ensuring normal transmission compatible with different terminals and services.

Figure 10:
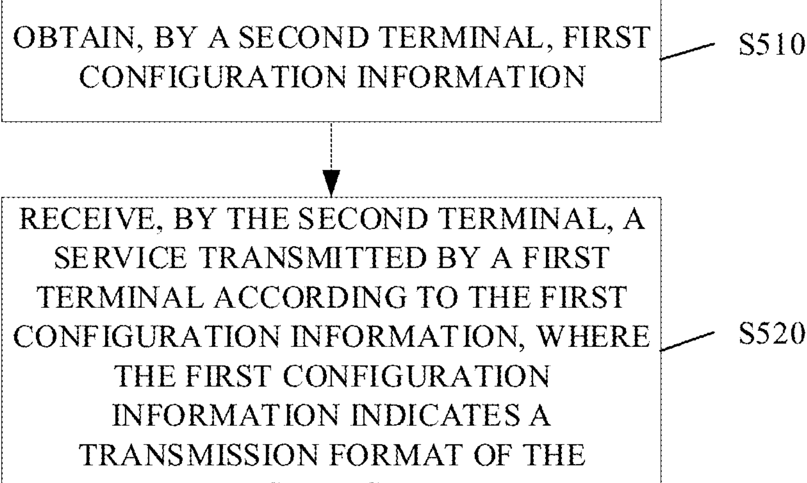
FIG. 10 is a schematic diagram of a method for wireless communication according to other embodiments of the disclosure.

Correspondingly, embodiments of the disclosure further provide a method for wireless communication applied to a second terminal. The following describes other embodiments of the disclosure in detail with reference to FIG. 10. It should be understood that these embodiments correspond to the foregoing method embodiments. For similar descriptions, reference may be made to the foregoing method embodiments. FIG. 10 illustrates a schematic diagram of a method for wireless communication 500 according to other embodiments of the disclosure. The method includes the following.

S510: A second terminal obtains first configuration information.

S520: The second terminal receives a service transmitted by a first terminal according to the first configuration information, where the first configuration information indicates a transmission format of the service.

In some embodiments, the first configuration information includes release information and/or compatibility information.

In some embodiments, the second terminal receives the service transmitted by the first terminal according to the first configuration information as follows. A transmission format corresponding to the release information is determined according to the release information, and the second terminal receives the service according to the transmission format corresponding to the release information, and/or a transmission format corresponding to the compatibility information is determined according to the compatibility information, and the second terminal receives the service according to the transmission format corresponding to the compatibility information.

In some embodiments, the compatibility information indicates that the service enables DRX, or the compatibility information indicates that the service does not enable DRX.

In some embodiments, the release information indicates a protocol release compatible with the service.

In some embodiments, a value of the release information indicates a target release corresponding to the service among at least two releases, and the at least two releases include a first release and a second release.

In some embodiments, the release information is a first release and/or a second release, the first release does not support DRX, and the second release supports DRX.

In some embodiments, the first configuration information is determined according to a service type of the service and/or a groupcast identity of the service.

In some embodiments, the service type includes at least one of: platooning between UEs, sensor sharing, information sharing for automated driving, cooperative lane change, platooning informative exchange, information sharing with RSU, cooperative collision avoidance, or emergency trajectory alignment.

In some embodiments, the method further includes the following. The second terminal obtains second configuration information, where the second configuration information indicates a mapping between the first configuration information and the service type and/or a mapping between the first configuration information and the groupcast identity.

In some embodiments, the second configuration information is configured by a network device, predefined, or specified in a protocol.

In some embodiments, the method further includes the following. The second terminal receives the service according to a predefined transmission format if the second terminal fails to obtain the first configuration information, where the predefined transmission format includes a transmission format corresponding to the first release or a continuous reception mode.

In some embodiments, the second terminal receives the service transmitted by the first terminal according to the first configuration information as follows. The second terminal receives the service transmitted by the first terminal according to second terminal information and the first configuration information, where the second terminal information indicates a transmission format supported by the second terminal.

In some embodiments, the second terminal receives the service in a transmission format corresponding to the first release or a continuous reception mode if the second terminal information indicates that the second terminal is a terminal of the first release or does not support DRX, where the service includes a service of the first release or a service not supporting DRX.

In some embodiments, the service is received according to the first configuration information if the second terminal information indicates that the second terminal is a terminal of the second release or supports DRX.

In some embodiments, the second terminal receives the service in a transmission format corresponding to the first release or a continuous reception mode if the first configuration information indicates that the service is of the first release or does not support DRX, or the second terminal receives the service in at least one of: a DRX mode, the continuous reception mode, the transmission format corresponding to the first release, or a transmission format corresponding to the second release, if the first configuration information indicates that the service is of the second release or supports DRX.

In some embodiments, the method further includes the following. The second terminal transmits second terminal information to the first terminal, where the second terminal information indicates a transmission format supported by the second terminal.

In some embodiments, the method further includes the following. The second terminal receives a configuration signaling transmitted by the first terminal, where the configuration signaling includes no configuration related to the second terminal information. The second terminal determines a configuration complete signaling according to the configuration signaling. The second terminal transmits the configuration complete signaling and/or the second terminal information to the first terminal.

In some embodiments, the second terminal receives the service in a predefined transmission format if the second terminal only transmits the configuration complete signaling to the first terminal, where the predefined transmission format includes a transmission format corresponding to the first release or a continuous reception mode.

In some embodiments, the method further includes the following. The second terminal receives a compatibility enquiry signaling transmitted by the first terminal, where the compatibility enquiry signaling is used to enquire the second terminal information. The second terminal transmits the second terminal information to the first terminal.

In some embodiments, the first configuration information is a Tx profile or carried in the Tx profile.

Figure 11:
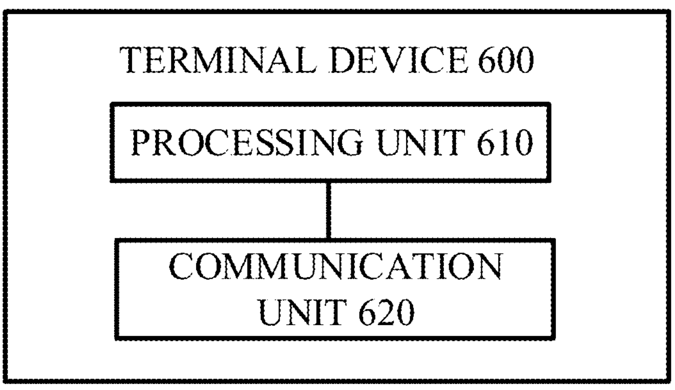
FIG. 11 is a schematic block diagram of a terminal device provided according to embodiments of the disclosure.

FIG. 11 illustrates a schematic block diagram of a terminal device 600 according to embodiments of the disclosure, which is applicable to SL transmission between a first terminal and a second terminal. The terminal device 600 is the first terminal. As illustrated in FIG. 11, the terminal device 600 includes a processing unit 610 and a communication unit 620. The processing unit 610 is configured to obtain first configuration information. The communication unit 620 is configured to transmit a service to a second terminal according to the first configuration information, where the first configuration information indicates a transmission format of the service.

In some embodiments, the first configuration information includes release information and/or compatibility information.

In some embodiments, the processing unit 610 is further configured to: determine a transmission format corresponding to the release information according to the release information, and control the communication unit 620 to transmit the service to the second terminal according to the transmission format corresponding to the release information, and/or determine a transmission format corresponding to the compatibility information according to the compatibility information, and control the communication unit 620 to transmit the service to the second terminal according to the transmission format corresponding to the compatibility information.

In some embodiments, the compatibility information indicates that the service enables DRX, or the compatibility information indicates that the service does not enable DRX.

In some embodiments, the release information indicates a protocol release compatible with the service.

In some embodiments, a value of the release information indicates a target release corresponding to the service among at least two releases, and the at least two releases include a first release and a second release.

In some embodiments, the release information is a first release and/or a second release, the first release does not support DRX, and the second release supports DRX.

In some embodiments, the first configuration information is determined according to a service type of the service and/or a groupcast identity of the service.

In some embodiments, the service type includes at least one of: platooning between UEs, sensor sharing, information sharing for automated driving, cooperative lane change, platooning informative exchange, information sharing with RSU, cooperative collision avoidance, or emergency trajectory alignment.

In some embodiments, the processing unit 610 is further configured to: obtain second configuration information, where the second configuration information indicates a mapping between the first configuration information and the service type and/or a mapping between the first configuration information and the groupcast identity.

In some embodiments, the second configuration information is configured by a network device, predefined, or specified in a protocol.

In some embodiments, the processing unit 610 is further configured to: control the communication unit 620 to transmit the service to the second terminal according to a predefined transmission format if the first terminal fails to obtain the first configuration information, where the predefined transmission format includes a transmission format not supporting DRX or corresponding to the first release.

In some embodiments, the communication unit 620 is further configured to: transmit the service to the second terminal according to first terminal information and the first configuration information, where the first terminal information indicates a transmission format supported by the first terminal.

In some embodiments, the processing unit 610 is further configured to: control the communication unit 620 to transmit the service to the second terminal in a transmission format corresponding to the first release or a continuous transmission mode if the first terminal information indicates that the first terminal is a terminal of the first release or does not support DRX.

In some embodiments, the processing unit 610 is further configured to: control the communication unit 620 to transmit the service to the second terminal according to the first configuration information if the first terminal information indicates that the first terminal is a terminal of the second release or supports DRX.

In some embodiments, the processing unit 610 is further configured to: control the communication unit 620 to transmit the service to the second terminal in a transmission format corresponding to the first release or in a non-DRX continuous transmission mode if the first configuration information indicates that the service is of the first release or does not support DRX, or control the communication unit 620 to transmit the service to the second terminal in at least one of: a DRX mode, the continuous transmission mode, the transmission format corresponding to the first release, or a transmission format corresponding to the second release, if the first configuration information indicates that the service is of the second release or supports DRX.

In some embodiments, the communication unit 620 is further configured to: receive second terminal information transmitted by the second terminal, where the second terminal information indicates a transmission format supported by the second terminal.

In some embodiments, the processing unit 610 is further configured to: determine the first configuration information according to the second terminal information, and determine the transmission format of the service according to first terminal information and the first configuration information, and control the communication unit 620 to transmit the service to the second terminal according to the transmission format of the service.

In some embodiments, the communication unit 620 is further configured to: transmit a configuration signaling to the second terminal, where the configuration signaling includes no configuration related to the second terminal information, and receive a configuration complete signaling and/or the second terminal information transmitted by the second terminal.

In some embodiments, the communication unit 620 is further configured to: transmit a compatibility enquiry signaling to the second terminal, where the compatibility enquiry signaling is used to enquire the second terminal information, and receive the second terminal information transmitted by the second terminal.

In some embodiments, the communication unit 620 is further configured to: transmit the service to the second terminal according to a predefined transmission format if the first terminal fails to obtain the second terminal information, where the predefined transmission format includes a transmission format not supporting DRX or corresponding to the first release.

In some embodiments, a transmission mode of transmitting the service includes unicast, groupcast, or broadcast.

In some embodiments, a transmission mode of transmitting the service includes unicast.

In some embodiments, the first configuration information is a Tx profile or carried in the Tx profile.

Figure 12:
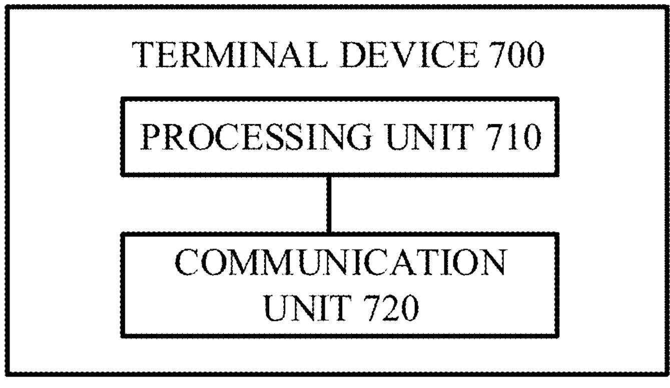
FIG. 12 is a schematic block diagram of a terminal device provided according to other embodiments of the disclosure.

FIG. 12 illustrates a schematic block diagram of a terminal device 700 according to other embodiments of the disclosure, which is applicable to SL transmission between a first terminal and a second terminal. The terminal device 700 is the second terminal. As illustrated in FIG. 12, the terminal device 700 includes a processing unit 710 and a communication unit 720. The processing unit 710 is configured to obtain first configuration information. The communication unit 720 is configured to receive a service transmitted by a first terminal according to the first configuration information, where the first configuration information indicates a transmission format of the service.

In some embodiments, the first configuration information includes release information and/or compatibility information.

In some embodiments, the processing unit 710 is further configured to: determine a transmission format corresponding to the release information according to the release information, and control the communication unit 720 to receive the service according to the transmission format corresponding to the release information, and/or determine a transmission format corresponding to the compatibility information according to the compatibility information, and control the communication unit 720 to receive the service according to the transmission format corresponding to the compatibility information.

In some embodiments, the compatibility information indicates that the service enables DRX, or the compatibility information indicates that the service does not enable DRX.

In some embodiments, the release information indicates a protocol release compatible with the service.

In some embodiments, a value of the release information indicates a target release corresponding to the service among at least two releases, and the at least two releases include a first release and a second release.

In some embodiments, the release information is a first release and/or a second release, the first release does not support DRX, and the second release supports DRX.

In some embodiments, the first configuration information is determined according to a service type of the service and/or a groupcast identity of the service.

In some embodiments, the service type includes at least one of: platooning between UEs, sensor sharing, information sharing for automated driving, cooperative lane change, platooning informative exchange, information sharing with RSU, cooperative collision avoidance, or emergency trajectory alignment.

In some embodiments, the processing unit 710 is further configured to: obtain second configuration information, where the second configuration information indicates a mapping between the first configuration information and the service type and/or a mapping between the first configuration information and the groupcast identity.

In some embodiments, the second configuration information is configured by a network device, predefined, or specified in a protocol.

In some embodiments, the communication unit 720 is further configured to: receive the service according to a predefined transmission format if the second terminal fails to obtain the first configuration information, where the predefined transmission format includes a transmission format corresponding to the first release or a continuous reception mode.

In some embodiments, the communication unit 720 is further configured to: receive the service transmitted by the first terminal according to second terminal information and the first configuration information, where the second terminal information indicates a transmission format supported by the second terminal.

In some embodiments, the processing unit 710 is further configured to: control the communication unit 720 to receive the service in a transmission format corresponding to the first release or a continuous reception mode if the second terminal information indicates that the second terminal is a terminal of the first release or does not support DRX, where the service includes a service of the first release or a service not supporting DRX.

In some embodiments, the processing unit 710 is further configured to: control the communication unit 720 to receive services according to the first configuration information if the second terminal information indicates that the second terminal is a terminal of the second release or supports DRX.

In some embodiments, the processing unit 710 is further configured to: control the communication unit 720 to receive the service in a transmission format corresponding to the first release or a continuous reception mode if the first configuration information indicates that the service is of the first release or does not support DRX, or control the communication unit 720 to receive the service in at least one of: a DRX mode, the continuous reception mode, the transmission format corresponding to the first release, or a transmission format corresponding to the second release, if the first configuration information indicates that the service is of the second release or supports DRX.

In some embodiments, the communication unit 720 is further configured to: transmit second terminal information to the first terminal, where the second terminal information indicates a transmission format supported by the second terminal.

In some embodiments, the communication unit 720 is further configured to: receive a configuration signaling transmitted by the first terminal, where the configuration signaling includes no configuration related to the second terminal information, and the processing unit 710 is configured to determine a configuration complete signaling according to the configuration signaling, and control the communication unit 720 to transmit the configuration complete signaling and/or the second terminal information to the first terminal.

In some embodiments, the processing unit 710 is further configured to: control the communication unit 720 to receive the service in a predefined transmission format if the second terminal only transmits the configuration complete signaling to the first terminal, where the predefined transmission format includes a transmission format corresponding to the first release or a continuous reception.

In some embodiments, the communication unit 720 is further configured to: receive a compatibility enquiry signaling transmitted by the first terminal, where the compatibility enquiry signaling is used to enquire the second terminal information, and transmit the second terminal information to the first terminal.

In some embodiments, the first configuration information is a Tx profile or carried in the Tx profile.

Optionally, in some embodiments, the communication unit may be a communication interface or a transceiver, or an input/output interface of a communication chip or an on-chip system. The processing unit may be one or more processors.

Figure 13:
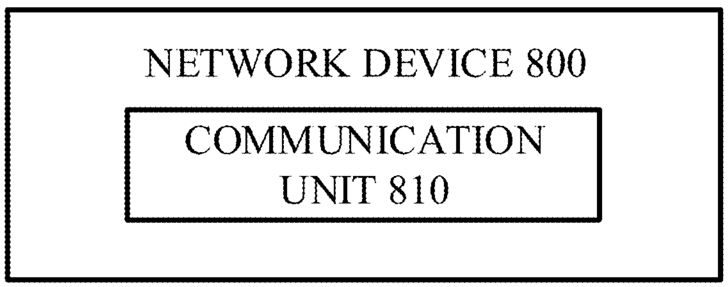
FIG. 13 is a schematic block diagram of a network device provided according to embodiments of the disclosure.

FIG. 13 illustrates a schematic block diagram of a network device 800 according to embodiments of the disclosure. As illustrated in FIG. 13, the network device 800 includes a communication unit 810. It should be understood that, the network device 800 according to embodiments of the disclosure may correspond to a network device in method embodiments of the disclosure. The above-mentioned and other operations and/or functions of each unit in the network device 800 correspond to corresponding procedures of the network device in method embodiments, which will not be repeated herein for the sake of simplicity.

Figure 14:
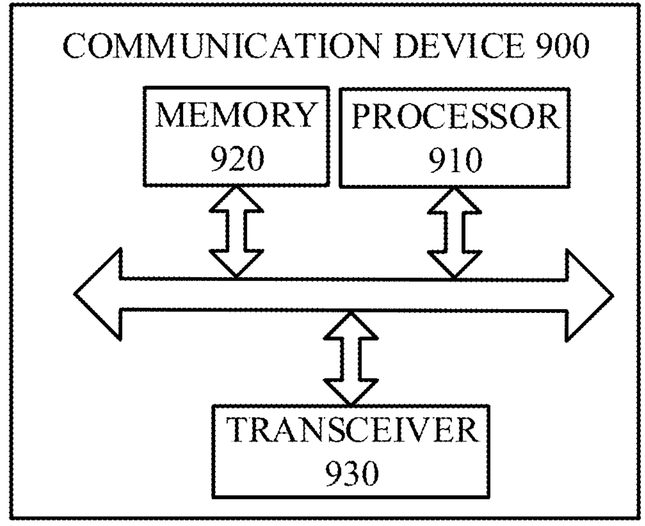
FIG. 14 is a schematic block diagram of a communication device provided according to embodiments of the disclosure.

FIG. 14 is a schematic structural diagram of a communication device 900 provided in embodiments of the disclosure. As illustrated in FIG. 14, the communication device 900 includes a processor 910. The processor 910 can invoke and execute computer programs stored in a memory to perform the method provided in embodiments of the disclosure.

Optionally, as illustrated in FIG. 14, the communication device 900 can further include the memory 920. The processor 910 can invoke and execute the computer programs stored in the memory 920 to perform the method provided in embodiments of the disclosure.

The memory 920 may be a separate device independent of the processor 910, or may be integrated into the processor 910.

Optionally, as illustrated in FIG. 14, the communication device 900 can further include a transceiver 930. The processor 910 can control the transceiver 930 to communicate with other devices, for example, to transmit information or data to other devices, or to receive information or data from other devices.

The transceiver 930 may include a transmitter and a receiver. The transceiver 930 may further include an antenna, where one or more antenna can be provided.

Optionally, the communication device 900 may be the network device in embodiments of the disclosure, and the communication device 900 can implement the corresponding procedures performed by the network device described in the foregoing method embodiments, which will not be repeated herein for the sake of simplicity.

Optionally, the communication device 900 may be the first terminal/second terminal in embodiments of the disclosure, and the communication device 900 can implement the corresponding procedures performed by the first terminal/second terminal described in the foregoing method embodiments, which will not be repeated herein for the sake of simplicity.

Figure 15:
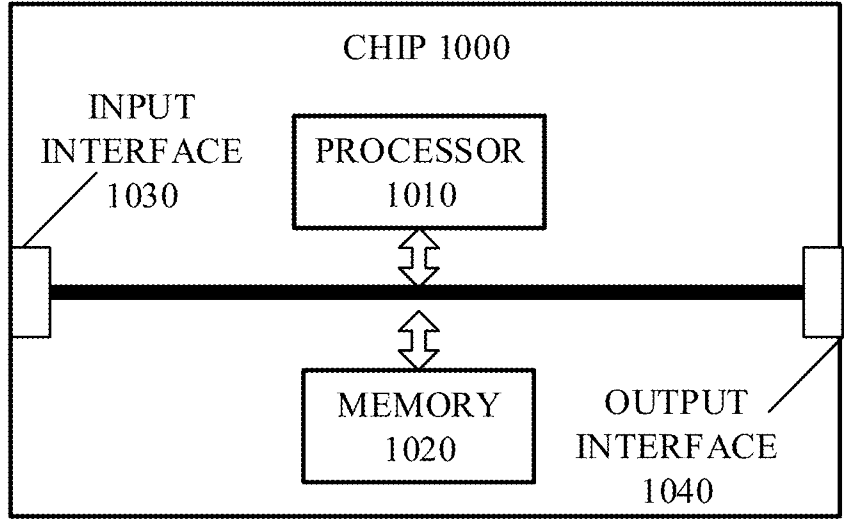
FIG. 15 is a schematic block diagram of a chip provided according to embodiments of the disclosure.

FIG. 15 is a schematic structural diagram of a chip according to embodiments of the disclosure. As illustrated in FIG. 15, the chip 1000 includes a processor 1010. The processor 1010 is configured to invoke and execute computer programs stored in a memory to perform the method provided in embodiments of the disclosure.

Optionally, as illustrated in FIG. 15, the chip 1000 further includes the memory 1020. The processor 1010 can invoke and execute the computer programs stored in the memory 1020 to perform the method provided in embodiments of the disclosure.

The memory 1020 may be a separate device independent of the processor 1010, or may be integrated into the processor 1010.

Optionally, the chip 1000 may further include an input interface 1030. The processor 1010 can control the input interface 1030 to communicate with other devices or chips, for example, to acquire information or data transmitted by other devices or chips.

Optionally, the chip 1000 may further include an output interface 1040. The processor 1010 can control the output interface 1040 to communicate with other devices or chips, for example, to output information or data to other devices or chips.

Optionally, the chip is applicable to the network device in embodiments of the disclosure, and the chip can implement the corresponding procedures performed by the network device described in the foregoing method embodiments, which will not be repeated herein for the sake of simplicity.

Optionally, the chip is applicable to the first terminal or the second terminal in embodiments of the disclosure, and the chip can implement the corresponding procedures performed by the first terminal or the second terminal described in the foregoing method embodiments, which will not be repeated herein for the sake of simplicity.

It should be understood that, the chip mentioned in embodiments of the disclosure may also be referred to as a system-level chip, a system chip, a chip system, or an on-chip system chip.

Figure 16:
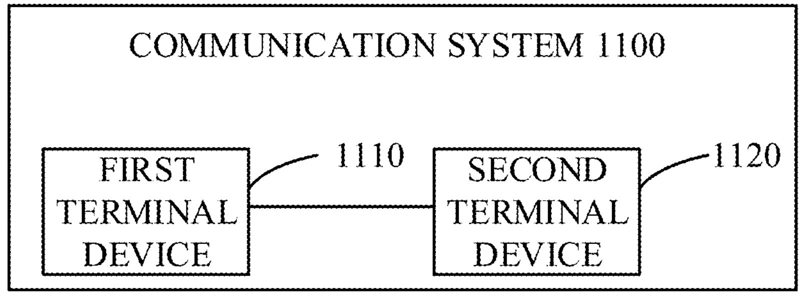
FIG. 16 is a schematic block diagram of a communication system provided according to embodiments of the disclosure.

FIG. 16 is a schematic block diagram of a communication system 1100 provided in an embodiment of the disclosure. As illustrated in FIG. 16, the communication system 1100 includes a first terminal 1110 and a second terminal 1120.

The first terminal 1110 may be configured to implement the corresponding functions implemented by the first terminal or the second terminal in the above methods, and the second terminal 1120 may be configured to implement the corresponding functions implemented by the second terminal in the above methods, which will not be repeated herein for the sake of simplicity.

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or perform the methods, steps, and logic blocks disclosed in embodiments. The general purpose processor may be a microprocessor, or the processor may be any conventional processor or the like. The steps of the method disclosed in embodiments may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to embodiments of the disclosure may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link dynamic random access memory (synch-link DRAM, SLDRAM), and a direct rambus RAM (DRRAM). It should be noted that, the memory of systems and methods described herein is intended to include, but is not limited to, these and any other suitable types of memories.

It should be understood that, the above description of the memory is intended for illustration rather than limitation. For example, the memory of embodiments of the disclosure may also be an SRAM, a DRAM, an SDRAM, a DDR SDRAM, an ESDRAM, an SLDRAM, a DR RAM, etc. In other words, the memory of embodiments of the disclosure is intended to include, but is not limited to, these and any other suitable types of memory.

Embodiments of the disclosure further provide a computer-readable storage medium. The computer-readable storage medium is configured to store computer programs.

Optionally, the computer-readable storage medium is applicable to the network device of embodiments of the disclosure. The computer programs are operable with a computer to implement the corresponding procedures performed by the network device described in the foregoing method embodiments, which will not be repeated herein for the sake of simplicity.

Optionally, the computer-readable storage medium is applicable to the mobile terminal/terminal device of embodiments of the disclosure. The computer programs are operable with a computer to implement the corresponding procedures performed by the mobile terminal/terminal device described in the foregoing method embodiments, which will not be repeated herein for the sake of simplicity.

Embodiments of the disclosure further provide a computer program product. The computer program product includes computer program instructions.

Optionally, the computer program product is applicable to the network device of embodiments of the disclosure. The computer program instructions are operable with a computer to implement the corresponding procedures by the network device described in the foregoing method embodiments, which will not be repeated herein for the sake of simplicity.

Optionally, the computer program product is applicable to the mobile terminal/terminal device of embodiments of the disclosure. The computer program instructions are operable with a computer to implement the corresponding procedures performed by the mobile terminal/terminal device described in the foregoing method embodiments, which will not be repeated herein for the sake of simplicity.

Embodiments of the disclosure further provide a computer program.

Optionally, the computer program is applicable to the network device of embodiments of the disclosure. The computer program, when executed by a computer, is operable with the computer to implement the corresponding procedures performed by the network device described in the foregoing method embodiments, which will not be repeated herein for the sake of simplicity.

Optionally, the computer program is applicable to the mobile terminal/terminal device of embodiments of the disclosure. The computer program, when executed by a computer, is operable with the computer to implement the corresponding procedures performed by the mobile terminal/terminal device described in the foregoing method embodiments, which will not be repeated herein for the sake of simplicity.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method embodiments, which will not be repeated herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in embodiments of the disclosure may be integrated into one processing unit or may be present as a number of physically separated units, and two or more units may be integrated into one.

If the integrated units are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various embodiments. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for wireless communication, comprising:

obtaining, by a first terminal, first configuration information;

transmitting, by the first terminal, a service to a second terminal according to the first configuration information, the first configuration information indicating a transmission format of the service; and transmitting, by the first terminal, the service to the second terminal according to a predefined transmission format if the first terminal fails to obtain the first configuration information, wherein the predefined transmission format comprises a transmission format not supporting discontinuous reception (DRX);

wherein the first configuration information comprises compatibility information, the compatibility information indicates that the service supports DRX, or the compatibility information indicates that the service does not support DRX, and the first configuration information is a transmission (Tx) profile or carried in the Tx profile; and wherein the first configuration information is determined according to a groupcast identity (ID) of the service.

2. The method of claim 1, wherein the first configuration information further comprises release information.

3. The method of claim 2, wherein the release information indicates a protocol release compatible with the service.

4. The method of claim 2, wherein transmitting, by the first terminal, the service to the second terminal according to the first configuration information comprises:

determining a transmission format corresponding to the release information according to the release information, and transmitting, by the first terminal, the service to the second terminal according to the transmission format corresponding to the release information; and/or determining a transmission format corresponding to the compatibility information according to the compatibility information, and transmitting, by the first terminal, the service to the second terminal according to the transmission format corresponding to the compatibility information.

5. The method of claim 2, wherein a value of the release information indicates a target release corresponding to the service among at least two releases, and the at least two releases comprise a first release and a second release.

6. The method of claim 2, wherein a transmission mode of transmitting the service comprises unicast, groupcast, or broadcast.

7. The method of claim 1, wherein the first configuration information is determined further according to a service type of the service.

8. A method for wireless communication, comprising:

obtaining, by a second terminal, first configuration information;

receiving, by the second terminal, a service transmitted by a first terminal according to the first configuration information, the first configuration information indicating a transmission format of the service and receiving, by the second terminal, the service transmitted by the first terminal according to a predefined transmission format if the first terminal fails to obtain the first configuration information, wherein the predefined transmission format comprises a transmission format not supporting discontinuous reception (DRX);

wherein the first configuration information comprises compatibility information, the compatibility information indicates that the service supports DRX, or the compatibility information indicates that the service does not support DRX, and the first configuration information is a transmission (Tx) profile or carried in the Tx profile; and wherein the first configuration information is determined according to a groupcast identity (ID) of the service.

9. The method of claim 8, wherein the first configuration information further comprises release information.

10. The method of claim 9, wherein the release information indicates a protocol release compatible with the service.

11. The method of claim 9, wherein receiving, by the second terminal, the service transmitted by the first terminal according to the first configuration information comprises:

determining a transmission format corresponding to the release information according to the release information, and receiving, by the second terminal, the service according to the transmission format corresponding to the release information; and/or determining a transmission format corresponding to the compatibility information according to the compatibility information, and receiving, by the second terminal, the service according to the transmission format corresponding to the compatibility information.

12. The method of claim 9, wherein a value of the release information indicates a target release corresponding to the service among at least two releases, and the at least two releases comprise a first release and a second release.

13. The method of claim 8, wherein the first configuration information is determined further according to a service type of the service.

14. A terminal device, comprising:

a transceiver;

a memory configured to store computer programs; and a processor configured to execute the computer programs stored in the memory to cause the terminal device to:

obtain first configuration information;

transmit a service to a second terminal according to the first configuration information, the first configuration information indicating a transmission format of the service; and transmit the service to the second terminal according to a predefined transmission format if the terminal device fails to obtain the first configuration information, wherein the predefined transmission format comprises a transmission format not supporting discontinuous reception (DRX);

wherein the first configuration information comprises compatibility information, the compatibility information indicates that the service supports DRX, or the compatibility information indicates that the service does not support DRX, and the first configuration information is a transmission (Tx) profile or carried in the Tx profile; and wherein the first configuration information is determined according to a groupcast identity (ID) of the service.

15. A terminal device, comprising:

a transceiver;

a memory configured to store computer programs; and a processor configured to execute the computer programs stored in the memory to cause the terminal device to:

obtain first configuration information; and receive a service transmitted by a first terminal according to the first configuration information, the first configuration information indicating a transmission format of the service; and receive the service transmitted by the first terminal according to a predefined transmission format if the first terminal fails to obtain the first configuration information, wherein the predefined transmission format comprises a transmission format not supporting discontinuous reception (DRX);

wherein the first configuration information comprises compatibility information, the compatibility information indicates that the service supports DRX, or the compatibility information indicates that the service does not support DRX, and the first configuration information is a transmission (Tx) profile or carried in the Tx profile; and wherein the first configuration information is determined according to a groupcast identity (ID) of the service.

* * * * *